(12) United States Patent
Paziński et al.

(10) Patent No.: US 11,719,122 B2
(45) Date of Patent: Aug. 8, 2023

(54) GAS TURBINE ENGINES INCLUDING EMBEDDED ELECTRICAL MACHINES AND ASSOCIATED COOLING SYSTEMS

(71) Applicants: General Electric Company, Schenectady, NY (US); General Electric Company Polska sp. z o.o., Warsaw (PL); General Electric Deutschland Holding GmbH, Frankfurt (DE)

(72) Inventors: Adam Tomasz Paziński, Warsaw (PL); Tomasz Jan Bulsiewicz, Warsaw (PL); Bartlomiej Drozd, Otrebusy (PL); Miroslaw Czarnik, Warsaw (PL); Mohamed Osama, Garching (DE); John R. Yagielski, Scotia, NY (US)

(73) Assignees: General Electric Company, Schenectady, NY (US); General Electric Company Polska sp. z.o.o., Warsaw (PL); General Electric Deutschland Holding GmbH, Frankfurt (DE)

( * ) Notice: Subject to any disclaimer, the term of this patent is extended or adjusted under 35 U.S.C. 154(b) by 136 days.

(21) Appl. No.: 17/170,215

(22) Filed: Feb. 8, 2021

(65) Prior Publication Data

US 2022/0251971 A1 Aug. 11, 2022

(51) Int. Cl.
*F01D 25/12* (2006.01)
*F01D 15/10* (2006.01)
(Continued)

(52) U.S. Cl.
CPC .............. *F01D 25/12* (2013.01); *F01D 15/10* (2013.01); *F02C 7/24* (2013.01); *F05D 2220/76* (2013.01); *F05D 2260/213* (2013.01); *F05D 2260/231* (2013.01); *H02K 5/203* (2021.01); *H02K 7/1823* (2013.01); *H02K 9/19* (2013.01)

(58) Field of Classification Search
CPC .......... F01D 15/10; F01D 25/12; F01D 9/065; F02C 7/14; F02C 7/24; F05D 2220/76; F05D 2260/213; F05D 2260/231; F05D 2260/232; F05D 2260/98; H02K 5/203; H02K 7/1823; H02K 9/19; Y02T 50/60
See application file for complete search history.

(56) References Cited

U.S. PATENT DOCUMENTS 5,271,248 A * 12/1993 Crowe .................... H02K 9/197
  62/505
7,208,854 B1 * 4/2007 Saban ...................... H02K 1/32
  310/52

(Continued)

*Primary Examiner* — Jesse S Bogue
(74) *Attorney, Agent, or Firm* — Dinsmore & Shohl LLP

(57) ABSTRACT

A method of removing heat from an electrical machine located in a gas turbine engine at least partially inward of a core airflow path in a radial direction, the electrical machine comprising an outer electrical machine stator and an inner electrical machine rotor is provided. The method includes directing a liquid coolant radially inward past the outer electrical machine stator and toward an inner electrical machine rotor using a coolant passageway. The liquid coolant is directed onto and/or through one or both of the inner electrical machine rotor and a rotor support thereby removing heat from the inner electrical machine rotor.

20 Claims, 14 Drawing Sheets

(51) Int. Cl.
    *F02C 7/24*    (2006.01)
    *H02K 5/20*    (2006.01)
    *H02K 7/18*    (2006.01)
    *H02K 9/19*    (2006.01)

(56) References Cited

U.S. PATENT DOCUMENTS

| | | | |
|---|---|---|---|
| 8,395,288 B2* | 3/2013 | Huynh | H02K 9/06 |
| | | | 310/59 |
| 8,450,888 B2 | 5/2013 | Shafer et al. | |
| 8,653,704 B2* | 2/2014 | Atarashi | H02K 7/006 |
| | | | 310/58 |
| 9,559,569 B2 | 1/2017 | Huang et al. | |
| 9,698,653 B2 | 7/2017 | Stiesdal | |
| 10,199,907 B2* | 2/2019 | Lin | H02K 9/225 |
| 10,326,344 B2 | 6/2019 | Hamann et al. | |
| 10,411,562 B2* | 9/2019 | Anghel | H02K 9/197 |
| 10,605,111 B2 | 3/2020 | Bywater | |
| 10,756,598 B2 | 8/2020 | Shaik et al. | |
| 10,819,182 B2 | 10/2020 | Michalski et al. | |
| 2017/0244306 A1* | 8/2017 | Lin | H02K 9/19 |
| 2017/0335795 A1 | 11/2017 | Klemen et al. | |
| 2019/0006913 A1* | 1/2019 | Stieger | H02K 1/32 |
| 2019/0101057 A1 | 4/2019 | Stevenson et al. | |
| 2019/0199169 A1* | 6/2019 | Huang | F02C 7/06 |
| 2020/0106342 A1* | 4/2020 | Chatterjee | H02K 7/1823 |
| 2022/0042458 A1* | 2/2022 | Long | F02C 7/12 |

\* cited by examiner

GAS TURBINE ENGINES INCLUDING EMBEDDED ELECTRICAL MACHINES AND ASSOCIATED COOLING SYSTEMS

BACKGROUND

Field

The present specification generally relates to gas turbine engines and, more specifically, to gas turbine engines that include embedded electrical machines and associated cooling systems for cooling the electrical machines.

Technical Background

Gas turbine engines are frequently used as part of aircraft propulsion systems. Gas turbine engines may include a compressor section, a combustion section, a turbine section and an exhaust section. Air is provided by a fan to the compressor section where the air is compressed and delivered to the combustion section. In the combustion section, the air is mixed with fuel and then burned. The combustion gases are then delivered to the turbine section, which drives the turbine section before delivering the combustion gases to the exhaust section.

During operation, temperatures within the gas turbine engines may be elevated. In order to manage the increases in temperature of the gas turbine engines, various cooling systems may be provided that are used to remove thermal energy from various components of the gas turbine engines. Certain components of the gas turbine engines may be more adept at handling increases in temperatures than other components. It may be desirable, for example, to limit temperature increases of electrical machines that may be embedded within the gas turbine engines.

SUMMARY

According to an embodiment of the present disclosure, a method of removing heat from an electrical machine located in a gas turbine engine at least partially inward of a core airflow path in a radial direction, the electrical machine comprising an outer electrical machine stator and an inner electrical machine rotor is provided. The method includes directing a liquid coolant radially inward past the outer electrical machine stator and toward an inner electrical machine rotor using a coolant passageway. The liquid coolant is directed onto and/or through one or both of the inner electrical machine rotor and a rotor support thereby removing heat from the inner electrical machine rotor.

A gas turbine engine includes a compressor section and a turbine section arranged in serial flow order. The compressor section and the turbine section together defining a core airflow path. A rotary member is rotatable with at least a portion of the compressor section and with at least a portion of the turbine section. An electrical machine is located at least partially inward of the core airflow path in a radial direction. The electrical machine includes an outer electrical machine stator and an inner electrical machine rotor that is coupled to the rotary member. A cooling system includes a coolant passageway that directs liquid coolant past the outer electrical machine stator to the inner electrical machine rotor for removing heat from the inner electrical machine rotor.

Additional features, embodiments and advantages of the gas turbine engines and methods of their use described herein will be set forth in the detailed description which follows, and in part will be readily apparent to those skilled in the art that such features, embodiments and advantages are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter described and claimed herein. The accompanying drawings are included to provide a further understanding of the various embodiments, and are incorporated into and constitute a part of this specification. The drawings illustrate the various embodiments described herein, and together with the description serve to explain the principles and operations of the subject matter described and claimed herein.

DETAILED DESCRIPTION

Embodiments described herein are generally directed to gas turbine engines that include embedded electrical machines and associated cooling systems for cooling the electrical machines. The gas turbine engines may include a compressor section and a turbine section arranged in serial flow order and together defining a core airflow path. A rotary member, such as a shaft, spool, etc., is rotatable with at least portions of the compressor section and turbine section. The electrical machine is embedded within the gas turbine engines. The electrical machine may be rotatable with the rotary member and positioned coaxially with the rotary member at least partially inward of the core airflow path along a radial direction of the gas turbine engines. The electrical machine may be an electric generator that is driven by the rotary member.

The gas turbine engines include a cooling system that cools the electrical machine, which may be needed due to the rearward location of the electrical machine in the gas turbine engines. In particular, the electrical machine may be located at least partially inward of the core airflow path in the radial direction and rearward within a tail cone. An enclosure may be provided that at least partially encloses the electrical machine. The enclosure may at least partially define at least one airflow path about the electrical machine. In some embodiments, the at least one airflow path about the electrical machine may receive air from an airflow passageway that is provided through a structural member of the gas turbine engines, such as a strut of a turbine rear frame.

The electrical machine includes an outer electrical machine stator and an inner electrical machine rotor. The outer electrical machine stator and the inner electrical machine rotor may each be located in separate compartments within an outer casing. The gas turbine engines include the cooling system that directs a liquid coolant to the outer electrical machine stator and the inner electrical machine rotor. For example, the outer electrical machine stator located in the stator compartment may include a coolant jacket that receives the liquid coolant from a liquid coolant source. Further, end windings of the outer electrical machine stator may be flooded in the liquid coolant. Liquid coolant is also delivered to the inner electrical machine rotor in the rotor compartment. The liquid coolant may be delivered to the inner electrical machine rotor through passageways and/or liquid coolant may be sprayed onto the electrical machine rotor. Because the stator compartment and the rotor compartment are separate compartments, the liquid coolant circuits through the outer electrical machine stator and inner electrical machine rotor can be maintained separate and not mix within the electrical machine.

Figure 1:
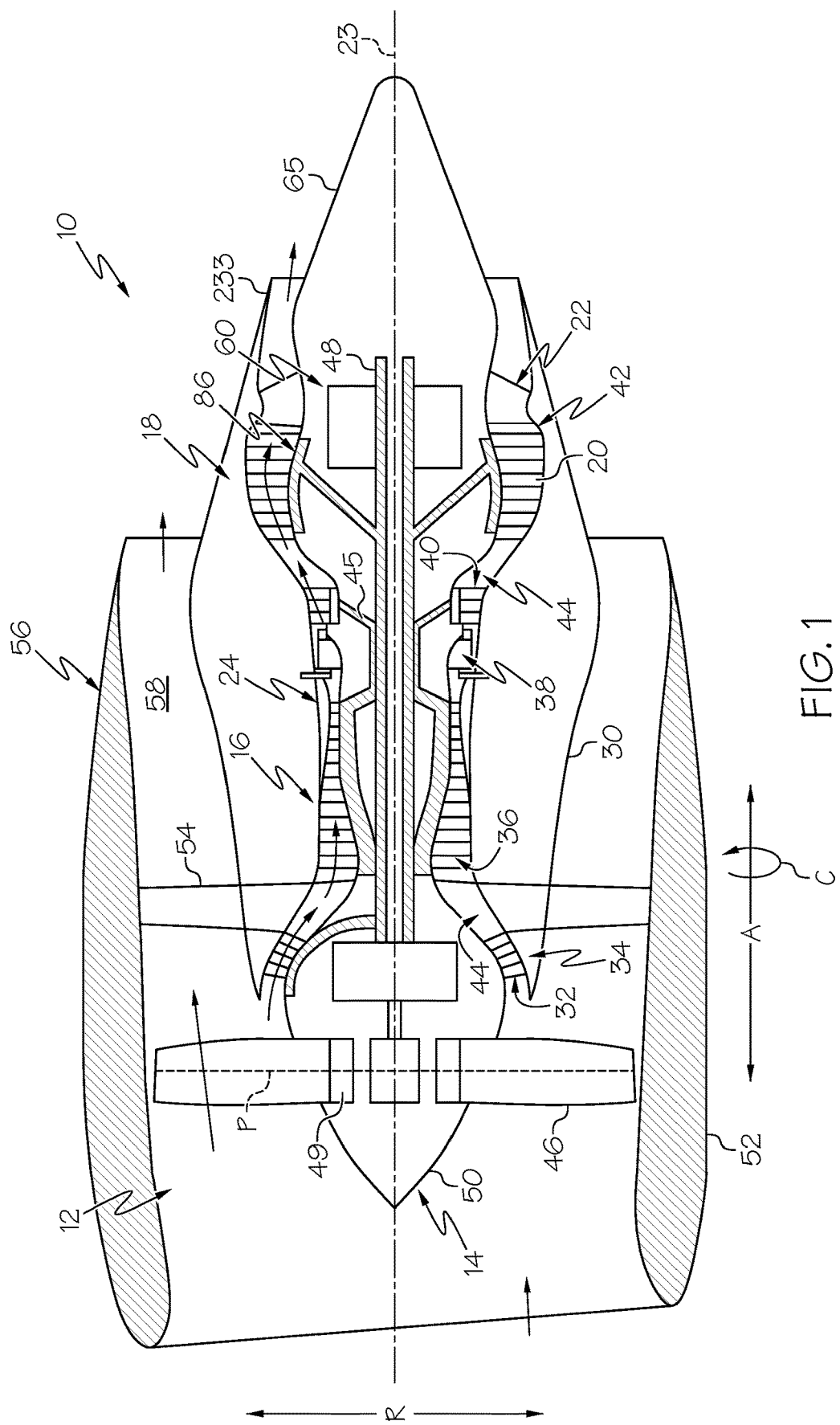
FIG. 1 is a diagrammatic section view of a gas turbine engine including an electrical machine, according to one or more embodiments shown and described herein.

Referring to FIG. 1, an exemplary gas turbine engine 10 may be configured for wing or fuselage mounting on an aircraft. In some embodiments, the gas turbine engine 10 may also be used to provide power. The gas turbine engine 10 includes a fan section 12 including a fan 14, a compressor section 16 and a turbine section 18. The fan section 12, compressor section 16 and turbine section 18 may include one or more rotor disks 20 that include rotor blades extending radially therefrom. Air is drawn into the gas turbine engine 10 and accelerated by the fan 14. The air, or at least a portion thereof, is compressed in the compressor section 16 and is delivered to a combustion chamber where the air is mixed with fuel and combusted thereby generating hot combustion gas. The combustion gases pass through the turbine section 18, which extracts mechanical work from the combustion gases to cause the attached compressor section 16 to turn and thereby further compress the upstream air to produce a self-sustaining process. The combustion gas is exhausted through a nozzle section 22.

The gas turbine engine 10 defines an axial direction A that extends parallel to a longitudinal centerline 23, a radial direction R that extends perpendicular to the axial direction A, and a circumferential direction C that extends about the axial direction A. As used herein, the terms "inner" and "outer" are used with reference to centerline 23 such that inner is closer to the centerline 23 and outer is farther from the centerline 23. The gas turbine engine 10 includes the fan section 12 and a core section 24 that is located downstream of the fan section 12 in the axial direction.

The gas turbine engine 10 includes a tubular core cowl 30 that defines, at least in part, an annular inlet 32. The core cowl 30 encases, in serial flow relationship, the compressor section 16 including a booster or low pressure (LP) compressor 34 and a high pressure (HP) compressor 36; a combustion section 38 that includes the combustion chamber; the turbine section 18 including a high pressure (HP) turbine 40 and a low pressure (LP) turbine 42; and the jet exhaust nozzle section 22. The compressor section 16, combustion section 38, and turbine section 18 together define a core airflow path 44 extending from the annular inlet 32 through the LP compressor 34, HP compressor 36, combustion section 38, and HP turbine 40. A first shaft or spool 45 drivingly connects the HP turbine 40 to the HP compressor 36. A second shaft or spool 48 drivingly connects the LP turbine 42 to the LP compressor 34 and the fan 14.

The fan section 12 includes the fan 14 having a plurality of fan blades 46 coupled to a disk 49 in a spaced apart manner. The fan blades 46 extend outwardly from disk 49 generally along the radial direction R. The disk 49 is covered by rotatable front hub 50 that is aerodynamically contoured to promote an air flow through the plurality of fan blades 46. The exemplary fan section 12 includes an annular fan casing or outer nacelle 52 that circumferentially surrounds the fan 14 and/or at least a portion of the core section 24. The outer nacelle 52 is supported relative to the core section 24 by a plurality of circumferentially-spaced struts that also serve as outlet guide vanes 54. A downstream section 56 of the outer nacelle 52 extends over an outer portion of the core cowl 30 to define a bypass airflow passage 58 therebetween.

The gas turbine engine 10 includes an electrical machine 60 that is rotatable with the fan 14 and is located within a tail cone 65. The electrical machine 60 is co-axially mounted to and rotatable with the second shaft 48. In other embodiments, an axis of the electrical machine 60 may be offset radially from the axis of the second shaft 48 and further may be oblique to the axis of the second shaft 48, such that the electrical machine 60 may be positioned at any suitable location at least partially inward of the core airflow path 44. In some embodiments, the electrical machine 60 may be rotatable with the first shaft 45.

The gas turbine engine 10 depicted in FIG. 1 is provided by way of example only. In other exemplary embodiments the gas turbine engine 10 may be replaced with other types of gas turbine engines utilizing an embedded electrical machine without loss of clarity. Examples include a turboprop engine, a turbojet engine, an open rotor, or inducted fan engine.

Figure 2:
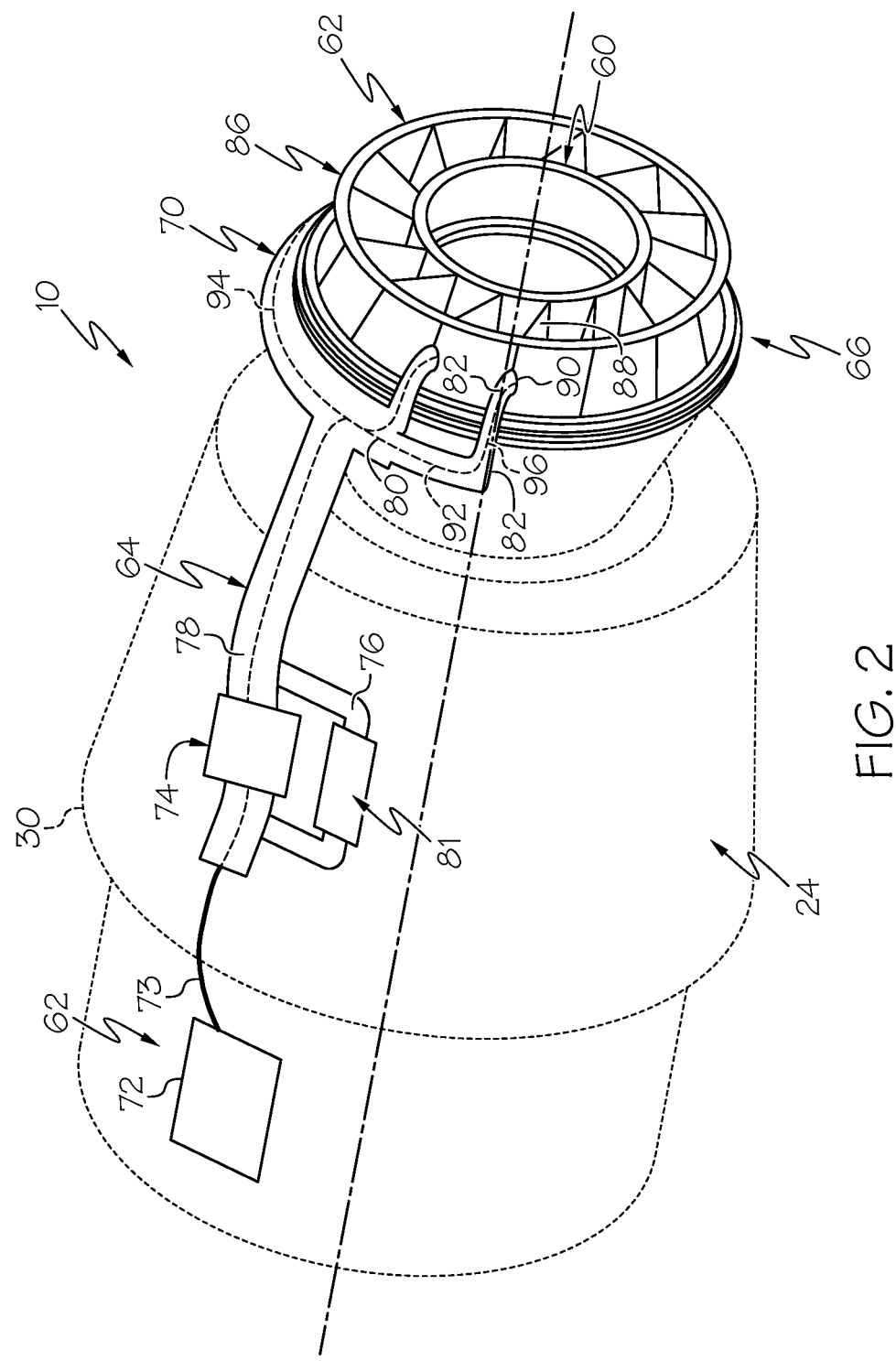
FIG. 2 is a diagrammatic perspective view of a portion of the gas turbine engine of FIG. 1 including a location for the electrical machine and both an electrical system and a cooling system for cooling the electrical system and electrical machine, according to one or more embodiments shown and described herein.

Referring to FIG. 2, a perspective view of a portion of the gas turbine engine 10 is illustrated diagrammatically and generally describes an electrical system 62 and a cooling system 64. The electrical system 62 includes the electrical machine 60 disposed in an aft portion 66 of the gas turbine engine 10 (FIG. 1). The aft portion 66 is disposed axially downstream the core section 24 of the gas turbine engine 10. The electrical machine 60 may convert mechanical energy (e.g., generated from exhaust gases generated in the core section 24) produced by the gas turbine engine 10 into electrical energy that may be used to power electrical devices of the gas turbine engine 10 or components disposed elsewhere on an aircraft incorporating the gas turbine engine 10. In some embodiments, the electrical machine 60 may convert electrical energy into mechanical energy. Positioning the electrical machine 60 in the aft portion 66 of the gas turbine engine 10 can render the electrical machine 60 accessible for maintenance, repair, and replacement. The electrical machine 60 may be integrated into the gas turbine engine 10 via a set of connections that may be removed without invasively disassembling the entirety of the gas turbine engine 10, such as without removing the gas turbine engine 10 from a wing of an aircraft.

Positioning the electrical machine 60 in the aft portion 66 provides accessibility to the electrical machine 60, but can create additional design considerations for the gas turbine engine 10. Exhaust gases generated via the core section 24 can be at relatively high temperatures (e.g., in excess of approximately 700° C. or more in various embodiments), which renders cooling the electrical machine 60 beneficial. Additionally, the aft portion 66 of the gas turbine engine 10 may not be directly connected to an aircraft incorporating the gas turbine engine 10 (e.g., the gas turbine engine 10 may be connected to a wing of an aircraft via a pylon extending from the outer nacelle 52 (FIG. 1) disposed radially outward from the core section 24). Given this, to provide the electrical power generated via the electrical machine 60 to other portions of the aircraft, the electrical power is routed through the gas turbine engine 10.

In view of the foregoing, the electrical system 62 includes a connection assembly 70 that is routed through the cooling system 64. The connection assembly 70 includes a plurality of electrical connectors 73 (e.g., power cables) that conductively connect the electrical machine 60 to a converter 72. For example, the electrical machine 60 may generate an alternating current ("AC") power signal from mechanical energy in the spinning LP shaft 48, which electrical power is routed to the converter 72 (located in the forward part of the engine) via the connection assembly 70. The converter 72 may generate a DC voltage from the AC power signal for communication to alternative locations on the aircraft (e.g., via an electrical communications bus). The structure of the converter 72 and connection assembly 70 may vary depending, at least in part, on the structure and capabilities of the electrical machine 60. For example, in various embodiments, the electrical machine 60 may generate an AC power signal having any number of phases (e.g., one phase, two phases, three phases, four phases, etc.).

The cooling system 64 routes cooling air from an air source to the electrical machine 60 to maintain the electrical machine 60 in a desired temperature range despite the electrical machine 60 being disposed proximate to relatively high temperature exhaust generated via the core section 24. The cooling system 64 may include a valve assembly 74 in fluid communication with the air source (see also FIG. 5A). In embodiments, the valve assembly 74 may be controlled by a controller (e.g., FADEC controlled) or it may be initiated for a pre-set period of time during or after engine shutdown. The blower may alternatively be operated for a period of time, based on a temperature sensor in proximity to the electrical machine or elsewhere within the core cowl. Upon initiating the blower (during or after shutdown) the valve assembly 74 is opened and cooling air drawn into the cooling system 64. The cooling system 64 may further include a bypass duct 76 that can be used to bypass the valve assembly 74. A cooling blower assembly 81 may be controlled via the controller to operate during time periods when the valve assembly 74 is closed. Cooling air may be provided to the electrical machine 60 using the bypass duct 76 and the cooling blower assembly 81 irrespective of a state of operation of the gas turbine engine 10. The cooling blower assembly 81 may be powered by an aircraft or another power source dedicated for use by the cooling blower assembly 81.

The cooling system 64 may include a plurality of different ducts having structures extending in different directions at various positions within the gas turbine engine 10. As depicted, the cooling system includes a main duct 78, a circumferential duct 80, and a plurality of electrical machine cooling ducts 82 that may or may not continue through struts 88 (i.e., the struts 88 may have their own airflow passageways; see FIGS. 6A-6D). The main duct 78, the circumferential duct 80, and the plurality of electrical machine cooling ducts 82 may be designed to provide adequate space for routing the connection assembly 70 to the electrical machine 60 while reducing impacts on aerodynamic performance of the gas turbine engine 10.

The valve assembly 74 controls airflow through the main duct 78. The main duct 78 directs the cooling air towards the aft portion 66 where the electrical machine 60 is located. The circumferential duct 80 divides the cooling air into circumferential portions and directs the cooling air in a circumferential direction around a turbine rear frame 86. In embodiments, the plurality of electrical machine cooling ducts 82 divide each circumferential portion of the cooling air into cooling portions that are provided to the electrical machine 60 via struts 88 of the turbine rear frame 86. In some embodiments, the cooling system 64 includes four electrical machine cooling ducts 82 that provide cooling air to the electrical machine 60 via four separate struts 88 of the turbine rear frame 86. It should be noted that any suitable existing structures of the gas turbine engine 10 may be made into cooling ducts configured to direct cooling air to a desired location. In embodiments, the electrical machine cooling ducts 82 extend through the struts 88 into an electrical machine coupler in fluid communication with the electrical machine 60 to cool the electrical machine 60. Each of the electrical machine cooling ducts 82 may attach to one of outer ends 90 of the struts 88 to provide cooling air into an internal cavity defined by the strut 88 to which that electrical machine duct 82 is attached. The struts 88 may be airfoil shaped and provide rigid structures between the core cowl 30 and internal components of the engine core, as well as turn the airflow exiting the engine core from an angular or swirling direction to an axial direction when exhausting the airflow.

The electrical connectors 73 of the connection assembly 70 extend through the main duct 78, the circumferential duct 80, the plurality of electrical machine cooling ducts 82 and the struts 88 of the turbine rear frame 86 to conductively connect the converter 72 to the electrical machine 60. In embodiments, various sets of electrical connectors of the electrical connection assembly 70 extend through different combinations of ducts of the cooling system 64 to connect different portions (e.g., terminations) of the electrical machine 60 to the converter 72. For example, a first subset of electrical connectors 92 may be directed through a first portion of the circumferential duct 80 and a second subset of electrical connectors 94 may be directed through a second portion of the circumferential duct 80. The first and second subsets of electrical connectors 92 and 94 may be further divided such that baseline sets of electrical connectors 96 are routed through each electrical machine duct 82, through one of the struts 88, and into the electrical machine coupler for electrical connection to the electrical machine 60.

Figure 3:
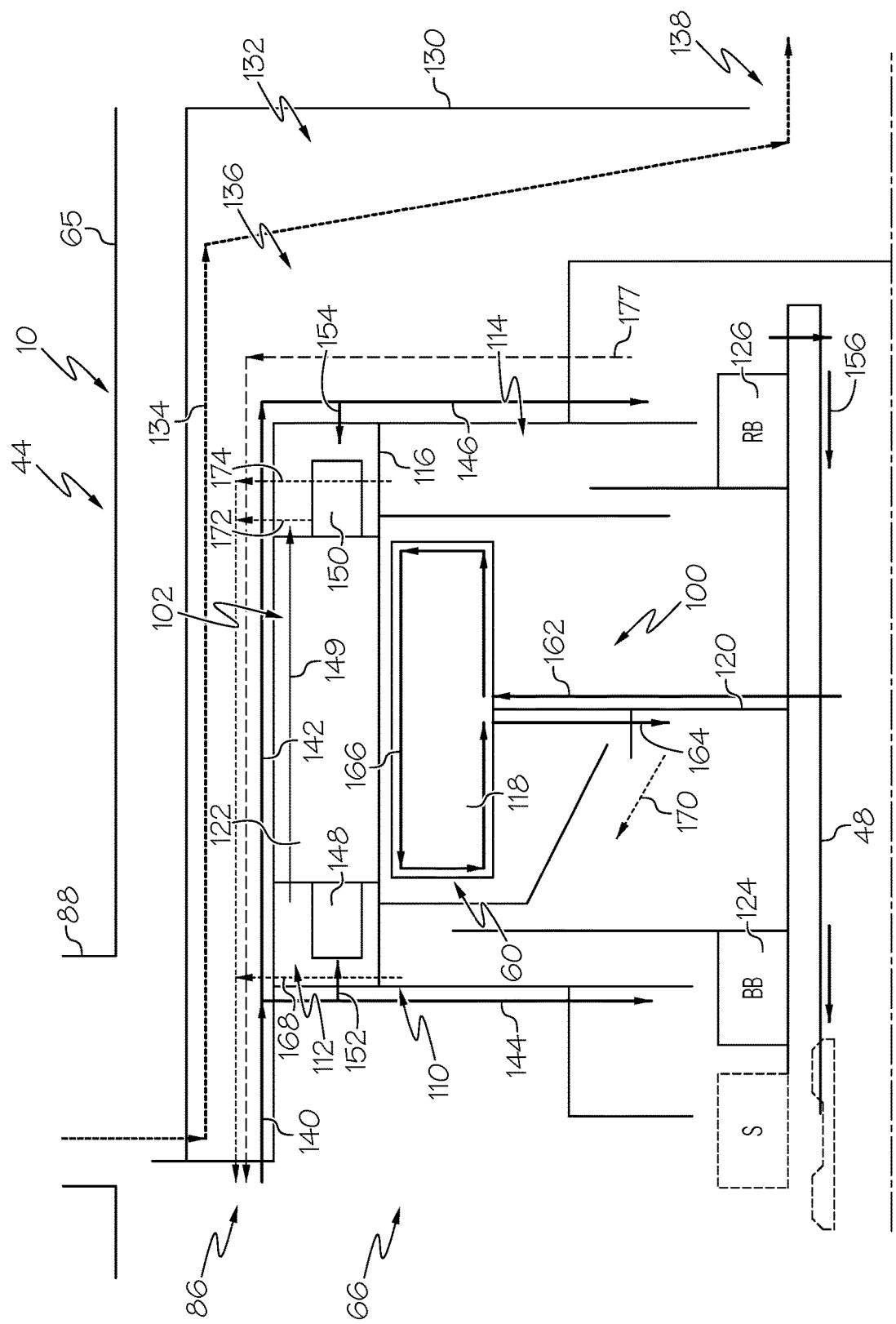
FIG. 3 is a diagrammatic section view of an aft portion of the gas turbine engine of FIG. 1 including the electrical machine inside an outer casing, according to one or more embodiments shown and described herein.

Referring to FIG. 3, the electrical machine 60 embedded within the aft portion 66 of the gas turbine engine 10, and in particular the tail cone 65, is shown diagrammatically. The electrical machine 60 is attached to the second shaft 48 by an electrical machine rotor subassembly 100. The electrical machine 60 includes the electrical machine rotor subassembly 100 and an electrical machine stator subassembly 102.

The entire electrical machine 60 is housed within an outer casing 110. The outer casing 110 is divided into a stator compartment 112 and a rotor compartment 114 by an axially extending dividing wall 116. The dividing wall 116 is formed and located to reduce or eliminate interference with the excitation field that is provided by an inner electrical machine rotor 118. The inner electrical machine rotor 118 is connected to the second shaft 48 by a rotor support 120 such that the inner electrical machine rotor 118 rotates with the second shaft 48. An outer electrical machine stator 122 is fixedly mounted to the outer casing 110. For example, the outer electrical machine stator 122 may be mounted upon the dividing wall 116. The outer casing 110 may be mounted to the second shaft 48 using bearings 124 and 126 such that the outer casing 110 and outer electrical machine stator 122 remain stationary within the gas turbine engine 10 while the inner electrical machine rotor 118 rotates. In some embodiments, the outer casing 110 may also be mounted to the turbine rear frame 86.

A thermal shield 130 defines an enclosure 132 that extends from the turbine rear frame 86 both axially and radially about the electrical machine 60. The thermal shield 130 may be formed of any suitable material, such as ceramic, aluminum, steel, etc. As used herein, a "thermal shield" refers to a structure that is effective in reducing one or more of convective, conductive and radiative heat transfer to the electrical machine 60.

The thermal shield 130 may at least partially define a path for cooling airflow 134 at between the core airflow path 44 and the electrical machine 60. The cooling airflow 134 may be received from the cooling system 64 (FIG. 2) that routes the cooling airflow 134 through the struts 88 and radially inward to the enclosure 132. The cooling airflow 134 provides an airflow buffer cavity 136 between the core airflow path 44 and the electrical machine 60 and then can be routed to an opening 138 in the thermal shield 130 and out of the tail cone 65.

To remove heat directly from the electrical machine 60, the outer electrical machine stator 122 and inner electrical machine rotor 118 are both in their own separated, wetted environments that are inside the airflow buffer cavity 136. A main liquid coolant supply (e.g., oil or any other suitable liquid coolant), represented by arrows 140, may be provided that delivers the liquid coolant into the outer casing 110. In the illustrated diagrammatic example, the main liquid coolant supply 140 first delivers the liquid coolant axially along passage 142 and then radially along passages 144 and 146. While not shown, any of the passages depicted by arrows may be a suitable form of conduit that carries the liquid coolant.

The end windings 148 and 150 may be flooded with the liquid coolant using nozzles, represented by arrows 152 and 154. A separate liquid coolant passage 149 (e.g., a cooling jacket) may be used to deliver a liquid coolant through the outer electrical machine stator 122. The liquid coolant in passage 149 may be the same or different composition than the liquid coolant of the main liquid coolant supply 140.

The liquid coolant is delivered past the outer electrical machine stator 122 and then delivered to the rotor support 120, as represented by arrows 156. In some embodiments, the liquid coolant may be used to lubricate and remove heat from bearings 124 and 126. The liquid coolant may then be delivered to and removed from the inner electrical machine rotor 118 along the rotor support 120 represented by arrows 162 and 164, respectively, as will be described in greater detail below. In some embodiments, the liquid coolant may be delivered by closed passages and/or sprayed onto the inner electrical machine rotor 118, e.g., using nozzles. In this regard, the rotor compartment 114 may act like a sump that collects and distributes the liquid coolant as the inner electrical machine rotor 118 rotates. In some embodiments, the inner electrical machine rotor 118, itself, may include passageways 166 through which the liquid coolant travels.

A coolant scavenge subsystem, represented by arrows 168, 170, 172 and 174, may be used to remove and recirculate the used lubricant from the rotor compartment 114 and back through the stator compartment 112. Screens, drains and/or valves, for example, may be located so that the used liquid coolant can be collected and removed, for example, back to the liquid coolant source (e.g., a tank). A drain 177 may also be provided that can remove the used liquid coolant from the rotor compartment 114 directly.

Figure 4:
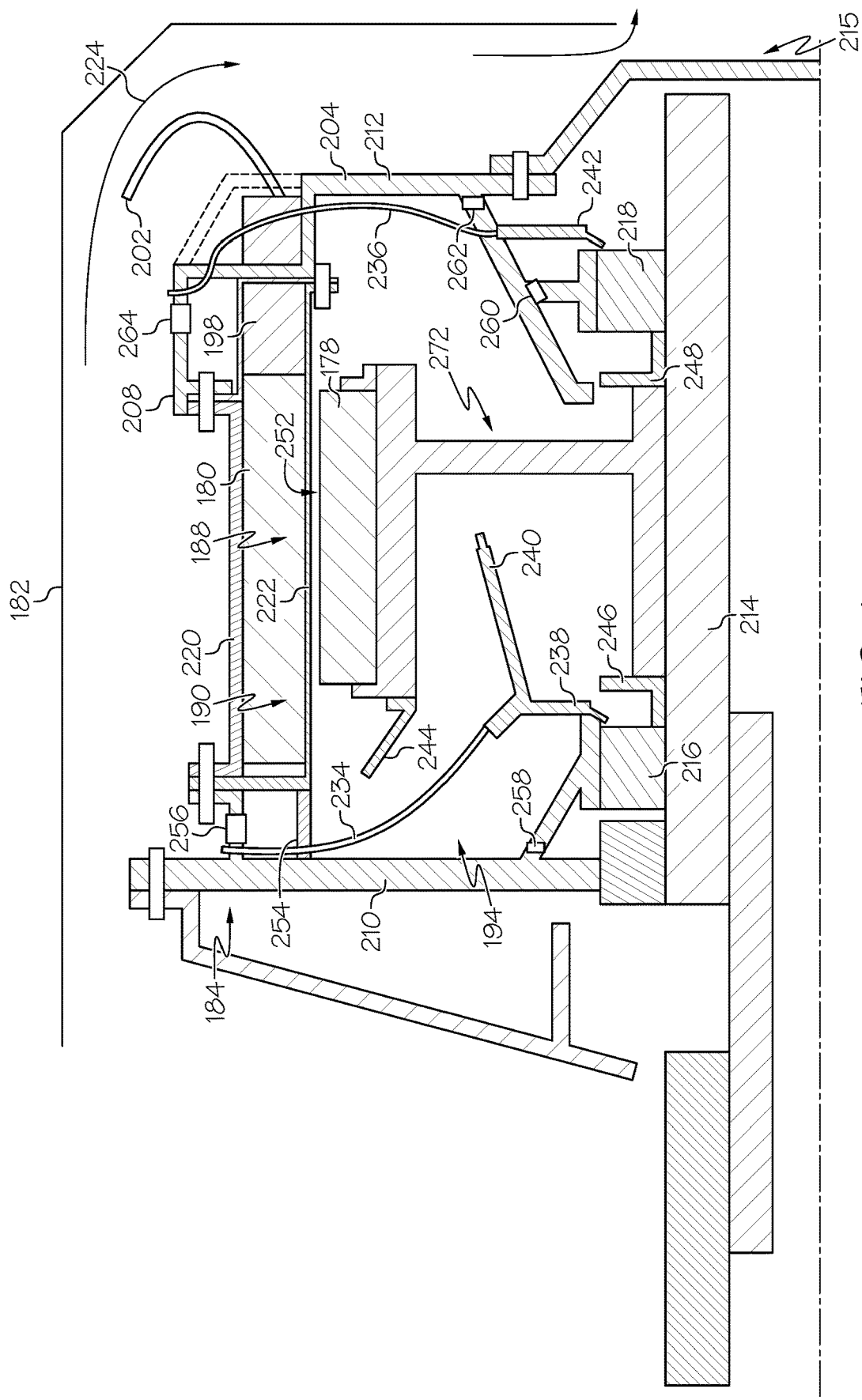
FIG. 4 is a diagrammatic section view of another embodiment of an aft portion of a gas turbine engine including an electrical machine inside an outer casing, according to one or more embodiments shown and described herein.

Referring now to FIG. 4, another simplified example includes many of the components discussed above including inner electrical machine rotor 178, outer electrical machine stator 180, thermal shield 182, etc. As above, an outer casing 184 houses an electrical machine 188 with a stator compartment 190 and outer electrical machine stator 180 and rotor compartment 194 and inner electrical machine rotor 178. An electrical connector 198 is illustrated that electrically connects the electrical machine 188 to another electrical device, such as the converter 72 of FIG. 2 using electrical lines 202. Although not shown, the electrical machine 60 of FIG. 3 also includes an electrical connector and electrical lines.

The outer casing 184 includes a frame 204 mounted to a turbine rear frame that includes an outer portion 208 and side portions 210 and 212. The side portions 210 and 212 may be connected to rotary member 214 using bearings 216 and 218 such that the outer casing 184 remains stationary while the rotary member 214 rotates. A cover 215 may be mounted to the frame 204 that covers the rotary member 214 and seals the end of the outer casing 184. A stator support 220 mounts the outer electrical machine stator 180 within the stator compartment 190. The outer casing 184 is divided into the stator compartment 190 and the rotor compartment 194 by an axially extending dividing wall 222.

Figure 5:
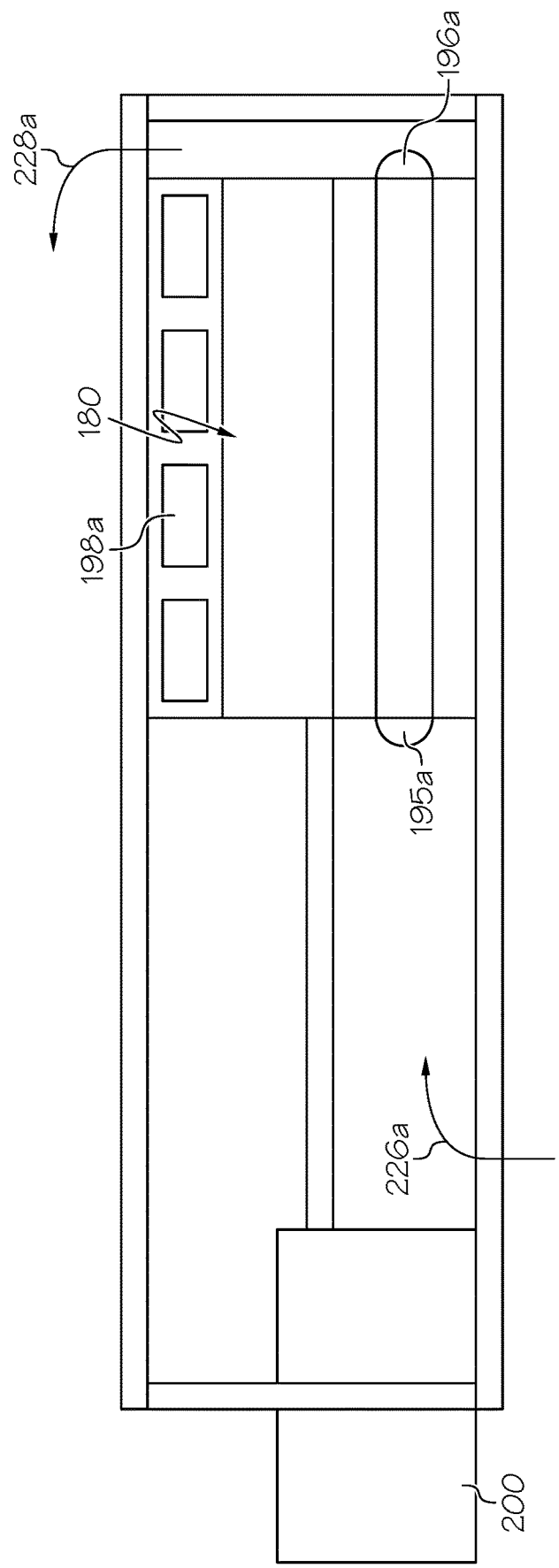
FIG. 5 illustrates a method of routing liquid coolant through a stator compartment of the outer casing of FIG. 4, according to one or more embodiments shown and described herein.
Figure 6:
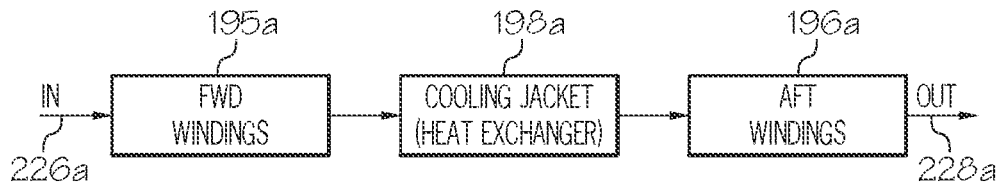
FIG. 6 illustrates diagrammatically the method of routing liquid coolant through a stator compartment of an outer casing of FIG. 5, according to one or more embodiments shown and described herein.

As above, the outer electrical machine stator 180 and inner electrical machine rotor 196 are both in their own separated, wetted environments that are inside an airflow buffer cavity 224. Any suitable method and system may be used to deliver liquid coolant to the outer electrical machine stator 180. FIGS. 5-9 diagrammatically illustrate various liquid coolant delivery schemes. Referring first to FIGS. 5 and 6, the stator compartment 190a is illustrated that includes the outer electrical machine stator 180a. The outer electrical machine stator 180a includes forward end windings 195a, aft end windings 196a and a cooling jacket 198a (i.e., heat exchanger) that extends between the end windings 195a and 196a. The outer electrical machine stator 192 is electrically connected to the electrical connector 200.

In the first example of FIGS. 5 and 6, the liquid coolant is delivered axially through a coolant inlet 226a, directly onto the forward end windings 195a and through the cooling jacket 198a. The used liquid coolant is then delivered to the aft end windings 196a and to a coolant outlet 228a where the used liquid coolant can then be recycled back to the coolant supply. It should be noted that only portions of the enclosure about the outer electrical machine stator 180 may be flooded with liquid coolant, while other portions may remain a dry air volume. Further, there may be any number of suitable inlets and outlets, such as two or more, such as four or more, etc.

Figure 7:
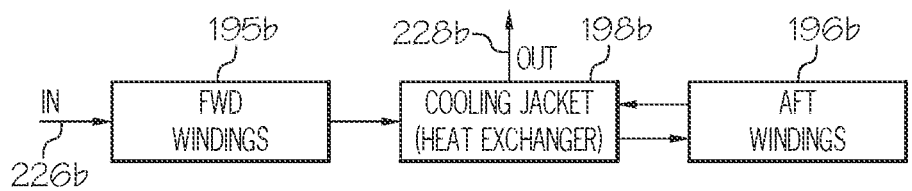
FIG. 7 illustrates a method of routing liquid coolant through a stator compartment of an outer casing, according to one or more embodiments shown and described herein.

In a second example, FIG. 7 illustrates a coolant delivery embodiment where liquid coolant is delivered axially through a coolant inlet 226b, directly onto the forward end windings 195b and through the cooling jacket 198b. The used liquid coolant is then delivered to the aft end windings 196b and back through the cooling jacket 198b. The used liquid coolant is then directed to a coolant outlet 228b at the cooling jacket 198b where the used liquid coolant can then be recycled back to the coolant supply.

Figure 8:
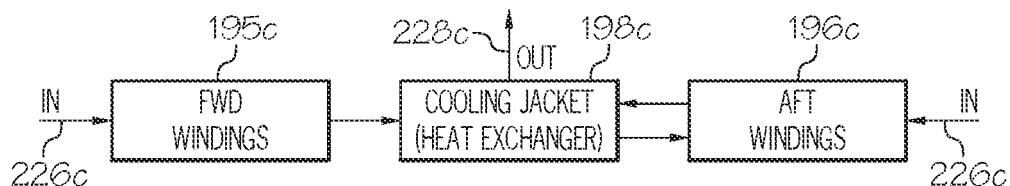
FIG. 8 illustrates a method of routing liquid coolant through a stator compartment of an outer casing, according to one or more embodiments shown and described herein.

In a third example, FIG. 8 illustrates a coolant delivery embodiment where liquid coolant is delivered radially and/or axially through opposite coolant inlets 226c and 230c, directly onto both the forward end windings 195c and aft end windings 196c and through the cooling jacket 198c. The used liquid coolant is then delivered from the forward end windings 195c and aft end windings 196c through the cooling jacket 198c. The used liquid coolant is then directed to a coolant outlet 228c at the cooling jacket 198c where the used liquid coolant can then be recycled back to the coolant supply.

Figure 9:
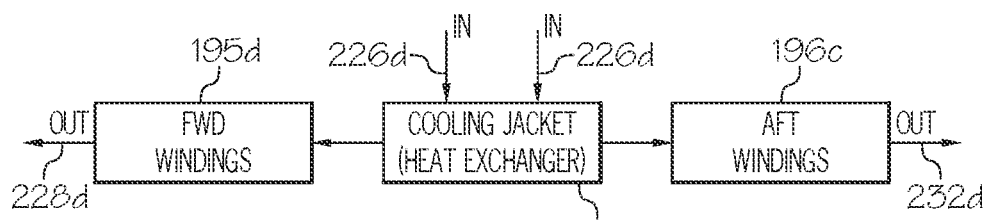
FIG. 9 illustrates a method of routing liquid coolant through a stator compartment of an outer casing, according to one or more embodiments shown and described herein.

In a fourth example, FIG. 9 illustrates a coolant delivery embodiment where liquid coolant is delivered radially through a coolant inlet 226d, directly into the cooling jacket 198d. The used liquid coolant is then delivered to both the forward end windings 195d and the aft end windings 196d. The used liquid coolant is then directed to coolant outlets 228d 232d at both end windings 195d and 196d where the used liquid coolant can then be recycled back to the coolant supply.

Referring again to FIG. 4, any suitable method and system may be used to deliver liquid coolant to the inner electrical machine rotor 178. In the example of FIG. 3, main liquid coolant passages 234 and 236 are routed through the stator compartment 190 and into the rotor compartment 194. The coolant passages 234 and 236 deliver the liquid coolant to nozzles 238, 240 and 242 that spray the liquid coolant in preselected directions and pressures onto the inner electrical machine rotor 178 and/or rotor support 272, as will be described below. Because it may be desirable to reduce liquid coolant contact with some components and/or locations, slingers 244, 246, 248 may be provided. The slingers 244, 246, 248 are structures, such as plates, O-rings, etc. that at least partially block the liquid coolant from entering preselected areas, such as a gap 252 between the inner electrical machine rotor 178 and the outer electrical machine stator 180.

As above, a coolant scavenge subsystem may be provided to remove and collect liquid coolant from the compartments 190 and 194. The stator compartment 190 may include, for example, a windage screen 254 that is porous and allows the liquid coolant to flow from the rotor compartment 194, through a drain port 256 and then through a return line (not shown) back to the liquid coolant supply. Various drain passages/ports 258, 260, 262, 264 may be provided to allow the liquid coolant to escape the outer casing 184 for reuse and/or disposal.

Figure 10A:
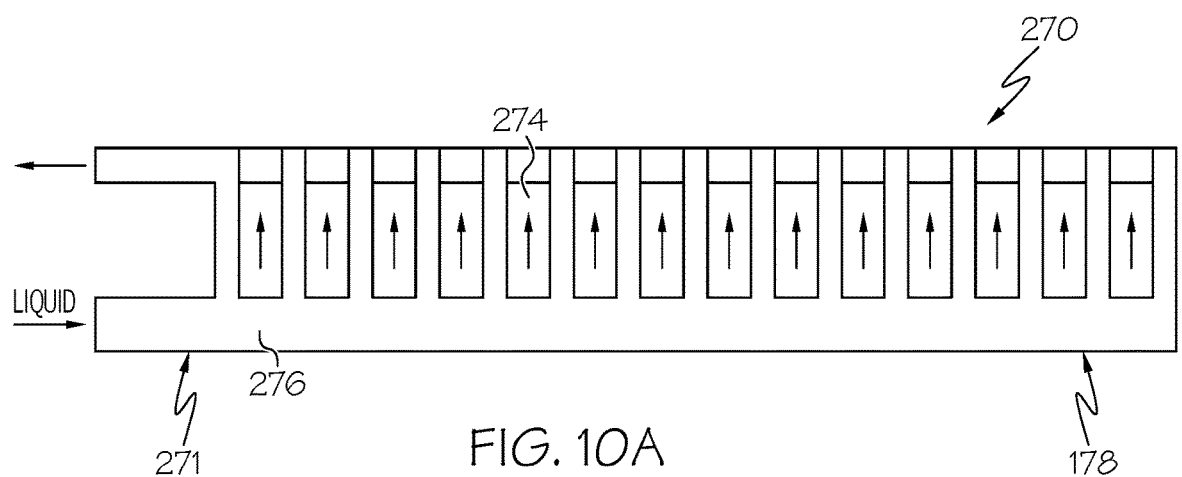
FIG. 10A is a diagrammatic section view of an electrical machine rotor of the electric machine of FIG. 4, according to one or more embodiments shown and described herein.
Figure 10B:
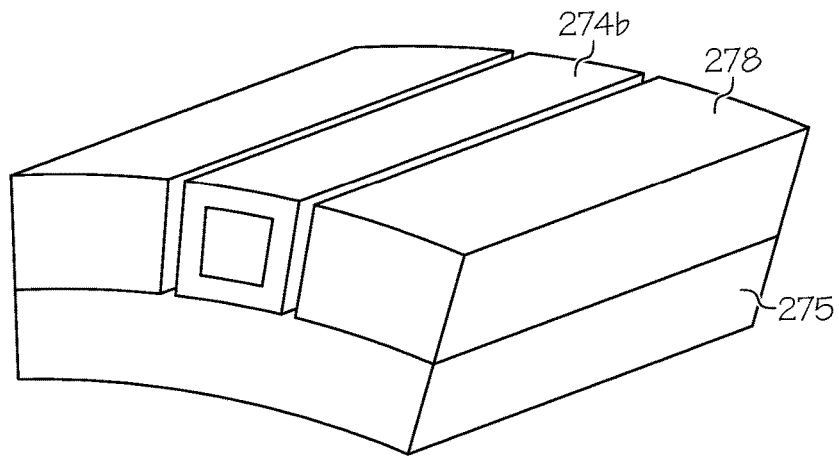
FIG. 10B is a diagrammatic section view of part of the inner electrical machine rotor of FIG. 10A, according to one or more embodiments shown and described herein.

FIG. 10A illustrates diagrammatically a portion of the inner electrical machine rotor 178 that can deliver liquid coolant to internal components of the inner electrical machine rotor 178. In this embodiment, the inner electrical machine rotor 178 includes an axially extending duct 271 forming a liquid coolant passageway 276 through the inner electrical machine rotor 178 and/or the rotor support 272 that provides liquid coolant to individual coolant passageways 274b. The coolant passageways 274b can be radially and/or axially extending and can send liquid coolant directly to the components of the inner electrical machine rotor 178. FIG. 10B, for example, illustrates passageway 274b directing liquid coolant between magnets 278.

Figure 10C:
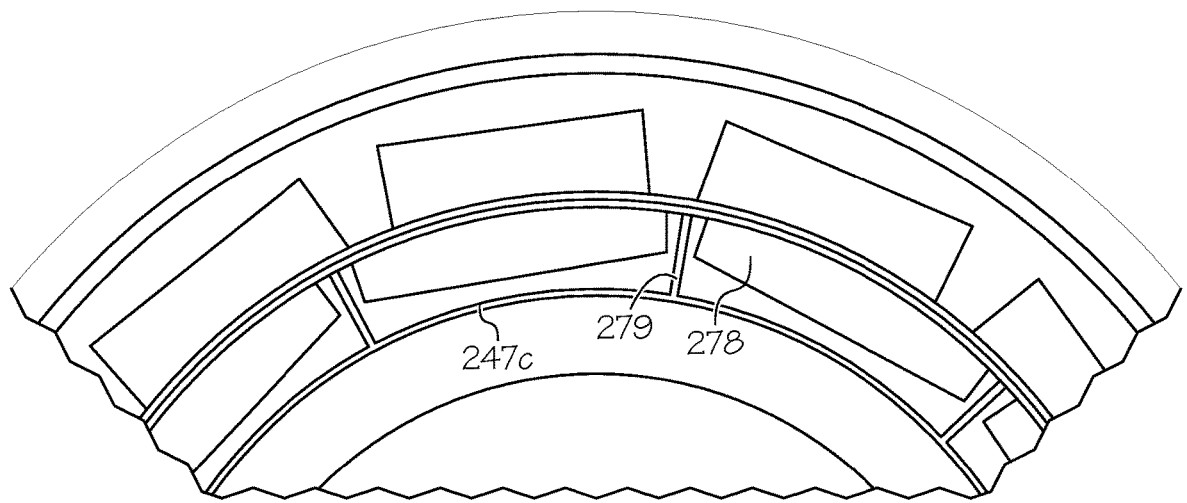
FIG. 10C is a diagrammatic section view of part of an outer electrical machine stator and inner electrical machine rotor for use with the electric machine of FIG. 4, according to one or more embodiments shown and described herein.

In some embodiments, axial passageways may lead to radial passageways through the rotor disk. In the example of FIG. 10C, an axially extending cooling duct 274c may be connected to or formed as part of rotor disk 275 and lead to radial passageways 279. The rotor disk 275 may include surface mounted permanent magnets 278 on opposite sides of the cooling passageway 279.

Figure 11A:
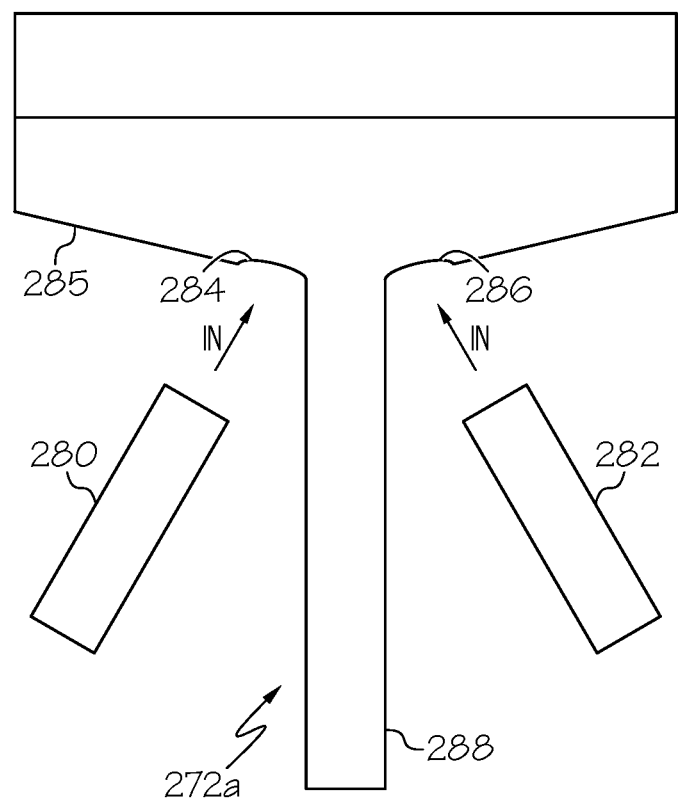
FIG. 11A is a diagrammatic section view of part of a rotor support for use with the electric machine of FIG. 4, according to one or more embodiments shown and described herein.
Figure 11B:
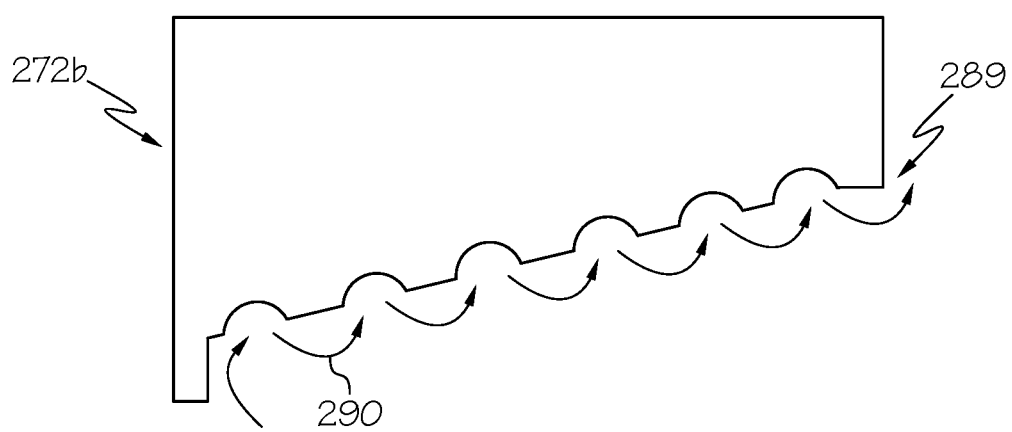
FIG. 11B is a diagrammatic section view of part of a rotor support for use with the electric machine of FIG. 4, according to one or more embodiments shown and described herein.

In some embodiments, the rotor support 272 may include coolant retaining features, such as recesses and/or baffles that are used to increase coolant dwell time on an internal surface of the rotor support 272. Referring to FIG. 11A, as an example, nozzles 280 and 282 may direct liquid coolant onto recesses 284 and 286 in an internal surface 285 on opposite sides of support web 288 of the rotor support 272a. The recesses 284 and 286 can be discontinuous or continuous forming a circle around the entire 360 degree disk shape of the rotor support 272. FIG. 11B illustrates another example of an array of recesses 289. As shown by the arrows 290, the centrifugal force on the liquid coolant due to the rotation of the rotor support 272b and the ramp-shape of the internal surface force the liquid coolant to travel axially to outer edges of the rotor support 272b. The recesses can be interconnected (e.g., to form a spiral-shape) or circular and separated.

Figure 12A:
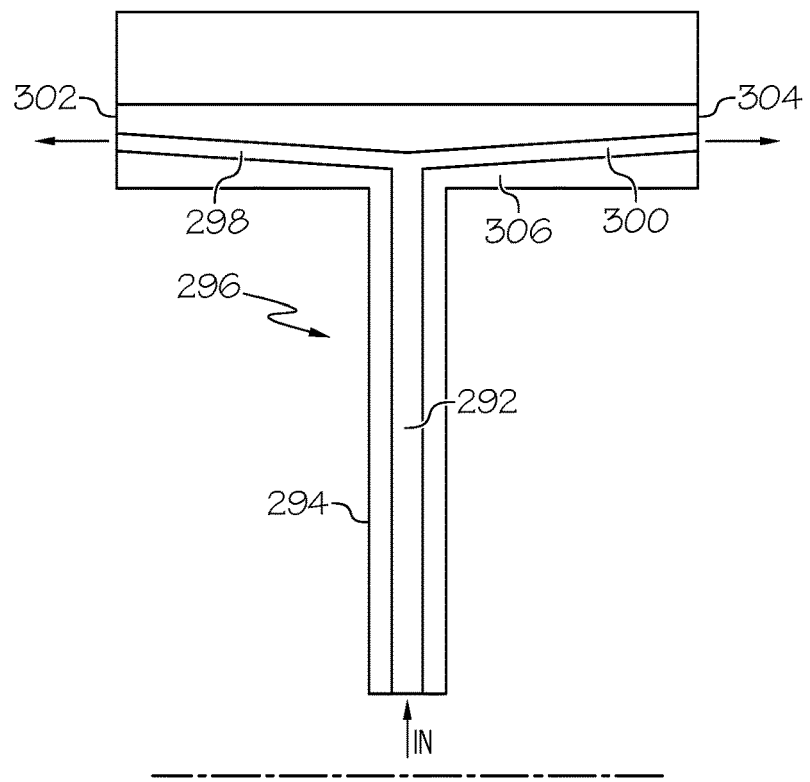
FIG. 12A is a diagrammatic section view of part of a rotor support for use with the electric machine of FIG. 4, according to one or more embodiments shown and described herein.
Figure 12B:
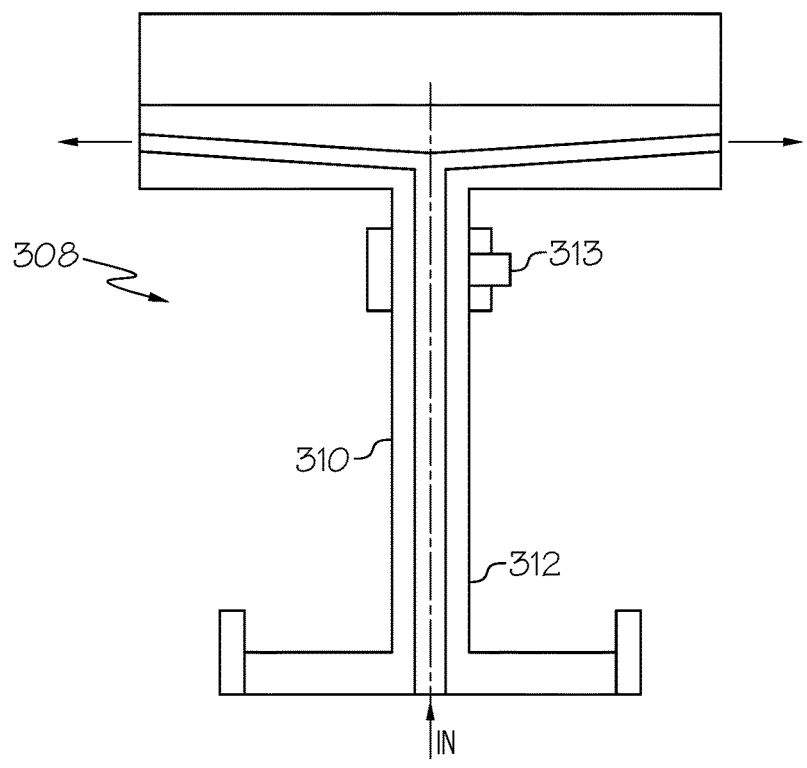
FIG. 12B is a diagrammatic section view of part of a rotor support for use with the electric machine of FIG. 4, according to one or more embodiments shown and described herein.
Figure 12C:
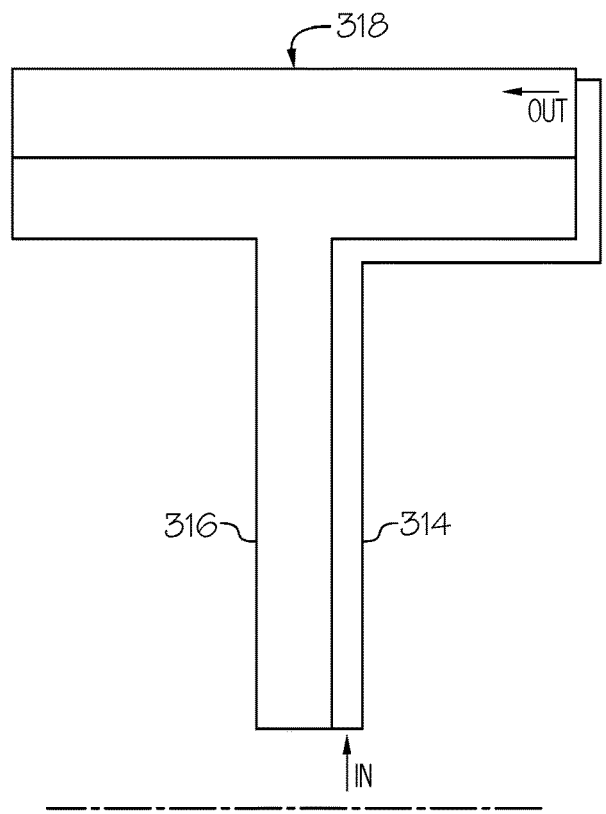
FIG. 12C is a diagrammatic section view of part of a rotor support for use with the electric machine of FIG. 4, according to one or more embodiments shown and described herein.
Figure 12D:
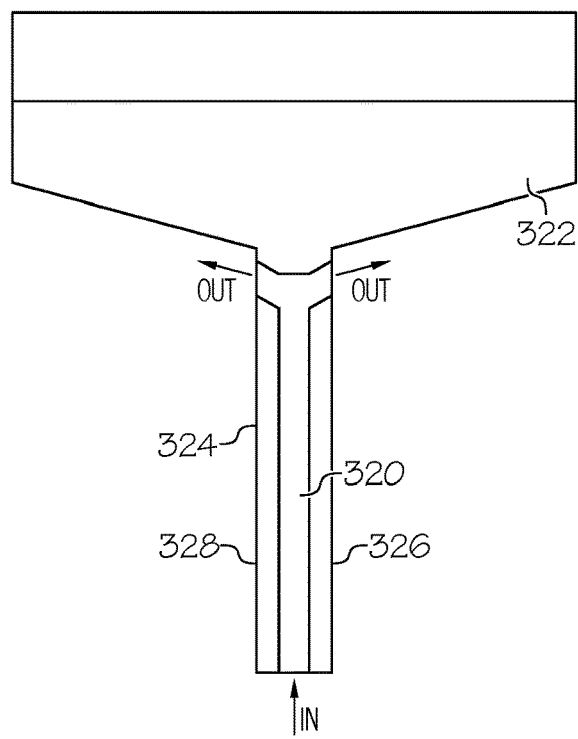
FIG. 12D is a diagrammatic section view of part of a rotor support for use with the electric machine of FIG. 4, according to one or more embodiments shown and described herein.
Figure 12E:
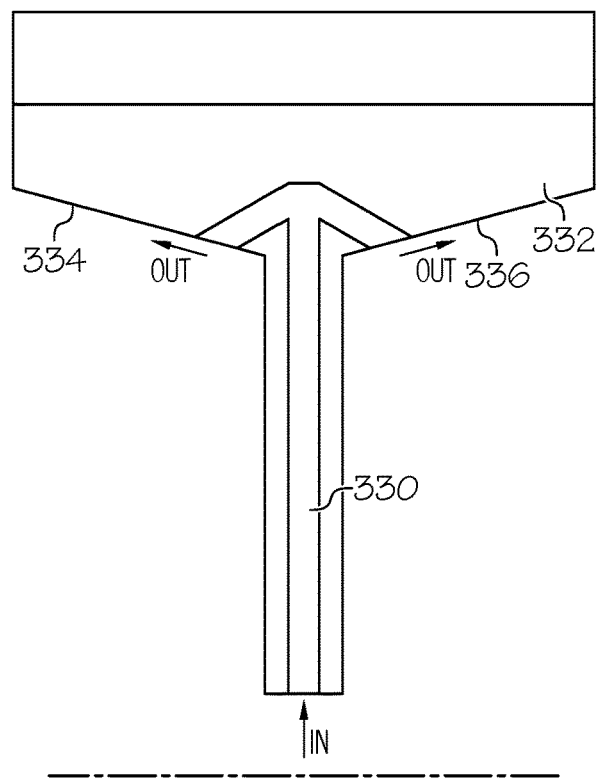
FIG. 12E is a diagrammatic section view of part of a rotor support for use with the electric machine of FIG. 4, according to one or more embodiments shown and described herein.
Figure 12F:
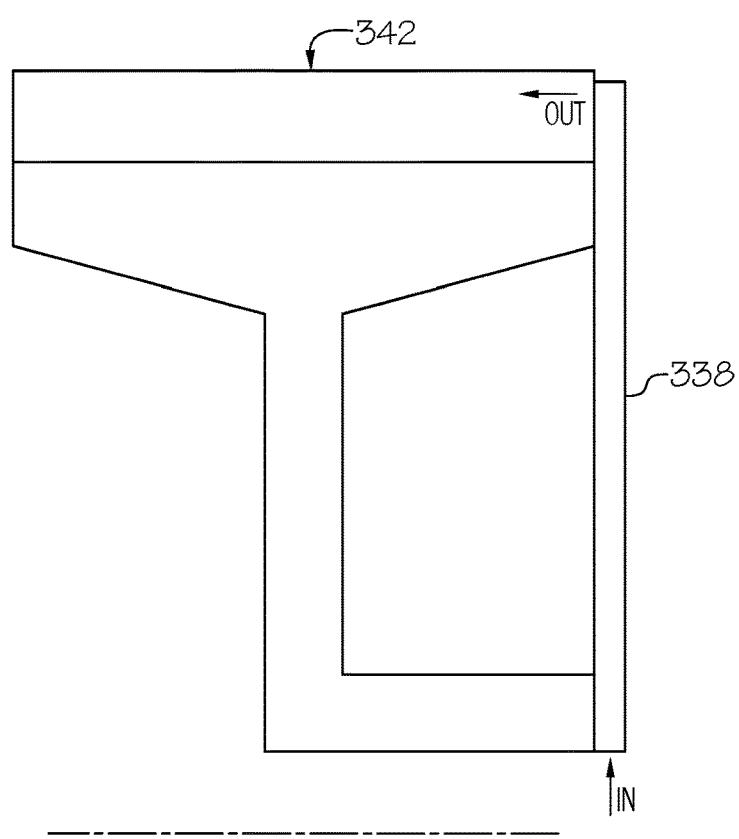
FIG. 12F is a diagrammatic section view of part of a rotor support for use with the electric machine of FIG. 4, according to one or more embodiments shown and described herein.

While use of nozzles are described primarily above to deliver liquid coolant to the inner electrical machine rotor 178, other delivery methods and structures are contemplated. FIGS. 12A-12F show different rotor support embodiments where coolant passageways are used to deliver the liquid coolant to the inner electrical machine rotor. Referring to FIG. 12A, a liquid coolant passageway 292 is provided through the support web 294 of the rotor support 296. The liquid coolant passageway splits into passageways 298 and 300 and the liquid coolant exits through opposite ends 302 and 304 of a rim 306 of the rotor support 296. FIG. 12B illustrates a similar embodiment, except for rotor support 308 is formed by half sections 310 and 312. Fixing features 313 are provided to secure the sections 310 and 312 together. FIG. 12C illustrates an embodiment where a liquid coolant passageway 314 is provided along an outer surface of the support web 316 and is delivered through the inner electrical machine rotor 318, for example, in a fashion similar to FIG. 10B. Referring to FIG. 12D, another embodiment is illustrated where liquid coolant passageway 320 splits below rim 322 and exits through opposite surfaces 324 and 326 of support web 328. FIG. 12E illustrates another embodiment where liquid coolant passageway 330 splits in rim 332 and exits through internal surfaces 334 and 336. FIG. 12F illustrates an embodiment using an external liquid coolant passageway 338 that is connected to rotor support 340 and liquid coolant is delivered through inner electrical machine rotor 342, for example, in a fashion similar to FIG. 10B.

Figure 13A:
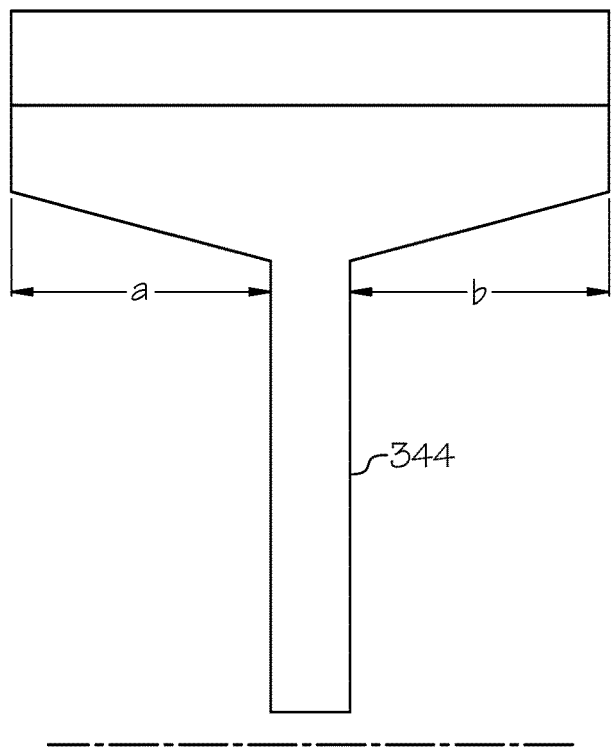
FIG. 13A is a diagrammatic section view of part of a rotor support for use with the electric machine of FIG. 4, according to one or more embodiments shown and described herein.
Figure 13B:
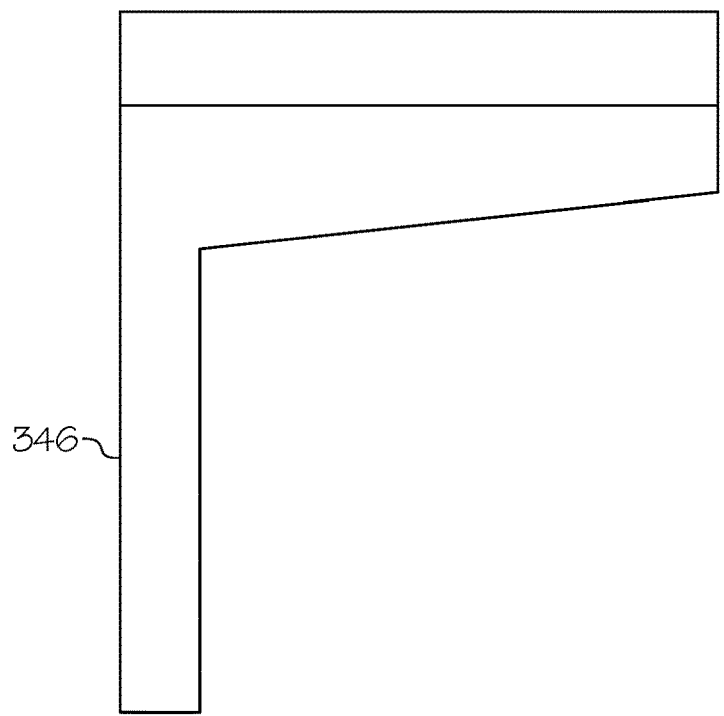
FIG. 13B is a diagrammatic section view of part of a rotor support for use with the electric machine of FIG. 4, according to one or more embodiments shown and described herein.
Figure 13C:
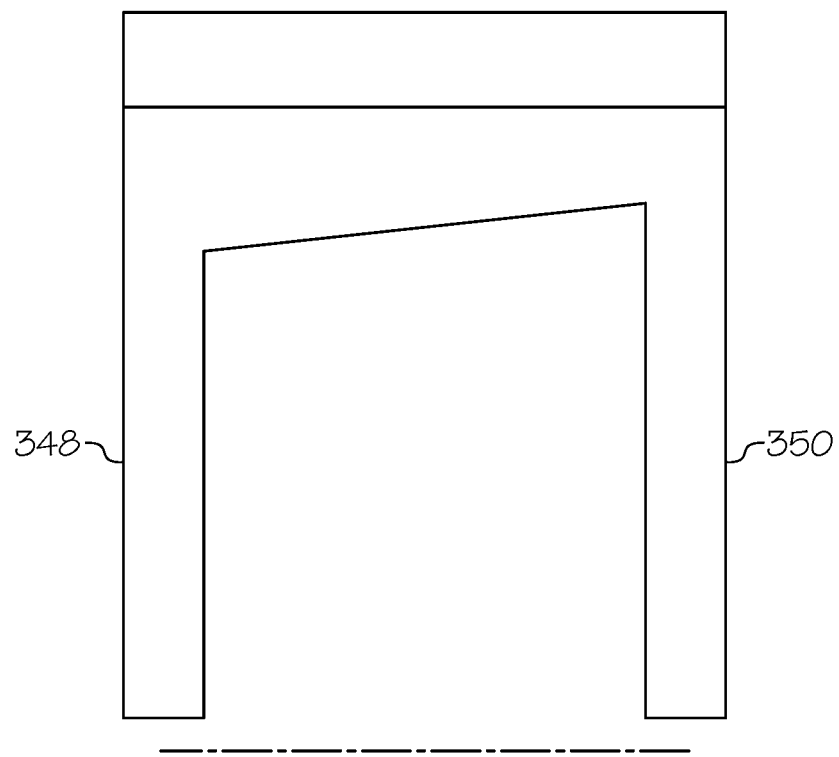
FIG. 13C is a diagrammatic section view of part of a rotor support for use with the electric machine of FIG. 4, according to one or more embodiments shown and described herein.
Figure 13D:
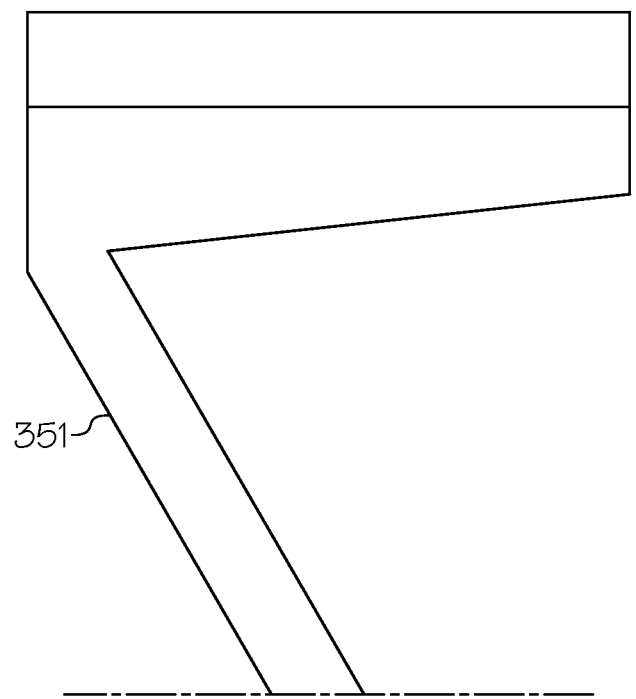
FIG. 13D is a diagrammatic section view of part of a rotor support for use with the electric machine of FIG. 4, according to one or more embodiments shown and described herein.

FIGS. 13A-13D illustrate various support web arrangements at different positions and angles relative to their support rims. FIG. 13A illustrates a middle support web 344 where a may or may not equal b. FIG. 13B illustrates an end support web 346. FIG. 13C illustrates multiple end support webs 348 and 350 and FIG. 13D illustrates an end support web 351 that is angled.

Figure 14:
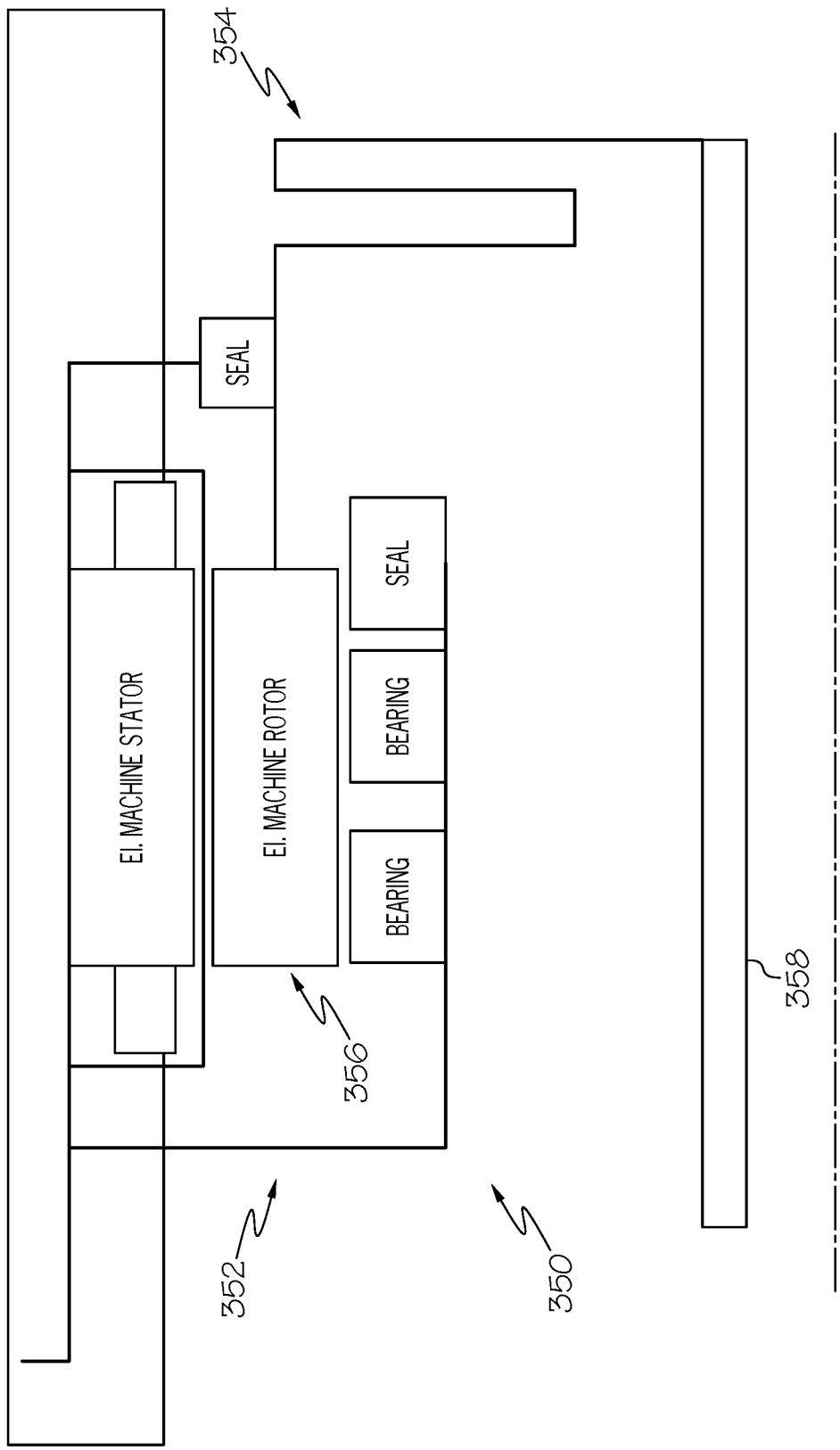
FIG. 14 is a diagrammatic section view of another embodiment of an aft portion of a gas turbine engine including electric machine inside an outer casing, according to one or more embodiments shown and described herein.

Referring to FIG. 14, another embodiment of a gas turbine engine 350 is illustrated showing an alternative outer casing 352 arrangement that incorporates a bellows support 354. The bellows support 354 not only supports inner electrical machine rotor 356, but also forms part of the outer casing 352. The bellows support 354 may be connected to rotatable member 358 so that the bellows support 354 rotates therewith.

The above-described jet turbine engines include cooling systems that help remove heat form the electrical machines (e.g., electrical machine assemblies) and create thermal barriers to reduce external heat load on the electrical machines. The cooling systems may include coolant passageways that direct the liquid coolant to desired locations, such as toward the inner electrical machine rotor and the end windings of the outer electrical machine stator. The coolant passageways can be used in preselected flow patterns in order to provide newer and used liquid coolant to desired locations. Further, the inner electrical machine rotor and/or rotor support may be provided with coolant passageways, cooling plates, etc. that facilitate liquid coolant reaching internal components of the electrical machine rotor. Such cooling passageways can amplify the internal cooling effects of the liquid coolant passing by and through the inner electrical machine rotor.

As used herein, the singular forms "a," "an" and "the" include plural referents unless the context clearly dictates otherwise. Thus, for example, reference to "a" component includes aspects having two or more such components, unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" may include any values within ten percent of a particular value, such as within five percent of a particular value, such as within two percent of a particular value, such as within one percent of a particular value.

Directional terms as used herein—for example up, down, right, left, front, back, top, bottom, upper, lower,—are made only with reference to the figures as drawn and are not intended to imply absolute orientation unless otherwise expressly stated. The terms "axial" and "longitudinal" both refer to a direction that is parallel to a centerline the gas turbine engine, while "radial" refers to a direction perpendicular to the longitudinal direction. The terms "tangential" and "circumferential" refer to a direction mutually perpendicular to both the radial and longitudinal directions. The terms "forward" or "front" refer to a location upstream in airflow passing through or around a component during operation, and the terms "aft" or "rear" refer to a location downstream during operation. These directional terms are used merely for convenience in the description and also do not require a particular orientation of the structures described thereby.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Further aspects are provided by the subject matter in the following clauses:

Clause 1: A method of removing heat from an electrical machine located in a gas turbine engine at least partially inward of a core airflow path in a radial direction, the electrical machine comprising an outer electrical machine stator and an inner electrical machine rotor, the method comprising: directing a liquid coolant radially inward past the outer electrical machine stator and toward an inner electrical machine rotor using a coolant passageway; and directing the liquid coolant onto and/or through one or both of the inner electrical machine rotor and a rotor support thereby removing heat from the inner electrical machine rotor.

Clause 2: The method of any of the above clauses, wherein the electrical machine is located within an outer casing.

Clause 3: The method of any of the above clauses, wherein the outer electrical machine stator is located in a stator compartment and the inner electrical machine rotor is located in a rotor compartment that is separated from the stator compartment.

Clause 4: The method of any of the above clauses comprising: directing liquid coolant along a first coolant passageway to the outer electrical machine stator thereby removing heat from the outer electrical machine stator; and directing liquid coolant along a second coolant passageway different from the first coolant passageway to the inner electrical machine rotor.

Clause 5: The method of any of the above clauses, wherein the liquid coolant from the first coolant passageway and the second coolant passageway does not mix within the electrical machine.

Clause 6: The method of any of the above clauses, wherein the step of directing liquid coolant along the first coolant passageway comprises directing liquid coolant to both forward and aft end windings, wherein the liquid coolant is introduced to the outer electrical machine stator through one or both the forward and aft end windings or a cooling jacket.

Clause 7: The method of any of the above clauses, wherein the step of directing liquid coolant along the second coolant passageway comprises spraying liquid coolant onto one or both of the inner electrical machine rotor and a rotor support that connects the inner electrical machine rotor to a rotary member.

Clause 8: The method of any of the above clauses, wherein the step of directing liquid coolant along the second coolant passageway comprises directing liquid coolant through a rotor support that connects the inner electrical machine rotor to a rotary member.

Clause 9: The method of any of the above clauses further comprising draining liquid coolant from the rotor compartment Clause 10: The method of any of the above clauses further comprising directing cooling air at least partially around the outer casing thereby forming a cooling air buffer.

Clause 11: A gas turbine engine comprising: a compressor section and a turbine section arranged in serial flow order, the compressor section and the turbine section together defining a core airflow path; a rotary member rotatable with at least a portion of the compressor section and with at least a portion of the turbine section; an electrical machine located at least partially inward of the core airflow path in a radial direction, the electrical machine comprising an outer electrical machine stator and an inner electrical machine rotor that is coupled to the rotary member; and a cooling system comprising a coolant passageway that directs liquid coolant past the outer electrical machine stator to the inner electrical machine rotor for removing heat from the inner electrical machine rotor.

Clause 12: The gas turbine engine of any of the above clauses further comprising an outer casing that encloses the electrical machine, the outer casing comprising a stator compartment that houses the outer electrical machine stator and a rotor compartment that houses the inner electrical machine rotor, the stator compartment separated from the rotor compartment.

Clause 13: The gas turbine engine of any of the above clauses, wherein a dividing wall separates the stator compartment and the rotor compartment.

Clause 14: The gas turbine engine of any of the above clauses comprising a nozzle located in the rotor compartment that is configured to spray liquid coolant onto one or both of the inner electrical machine rotor and a rotor support that connects the inner electrical machine rotor to the rotary member, the coolant passageway delivering liquid coolant to the nozzle.

Clause 15: The gas turbine engine of any of the above clauses further comprising a drain that drains liquid coolant from the rotor compartment.

Clause 16: The gas turbine engine of any of the above clauses further comprising a thermal shield forming an enclosure at least partially around the electrical machine, the thermal shield at least partially defining a cooling airflow path at least partially around the electrical machine.

Clause 17: The gas turbine engine of any of the above clauses further comprising a turbine rear frame downstream of the turbine section and comprising a strut that includes an airflow passageway extending radially through the strut in fluid communication with the enclosure.

Clause 18: The gas turbine engine of any of the above clauses, wherein the coolant passageway is a first coolant passageway, the cooling system comprising a second coolant passageway that directs liquid coolant to the outer electrical machine stator, wherein the liquid coolant is introduced to the outer electrical machine stator through one or both the forward and aft end windings or a cooling jacket.

Clause 19: The gas turbine engine of any of the above clauses further comprising a cooling plate inwardly adjacent the inner electrical machine rotor, the cooling plate having a radially extending channel that directs liquid coolant radially outward toward the inner electrical machine rotor.

Clause 20: The gas turbine engine of any of the above clauses, wherein the coolant passageway extends through a rotor support that connects the inner electrical machine rotor to the rotary member.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of removing heat from an electrical machine located in a gas turbine engine at least partially inward of a core airflow path in a radial direction, the electrical machine comprising an outer electrical machine stator and an inner electrical machine rotor, the method comprising:
   directing a liquid coolant radially inward past the outer electrical machine stator and toward an inner electrical machine rotor using a coolant passageway; and directing the liquid coolant radially outward along a rotor support that connects the electrical machine to a rotary member thereby and toward the inner electrical machine rotor thereby removing heat from the inner electrical machine rotor.

2. The method of claim 1, wherein the electrical machine is located within an outer casing.

3. The method of claim 2, wherein the outer electrical machine stator is located in a stator compartment and the inner electrical machine rotor is located in a rotor compartment that is separated from the stator compartment.

4. The method of claim 3, wherein the step of directing the liquid coolant radially inward past the outer electrical machine stator includes directing the liquid coolant along a first coolant passageway, the method further comprising directing the liquid coolant along a second coolant passageway different from the first coolant passageway to the inner electrical machine rotor.

5. The method of claim 4, wherein the liquid coolant in each of the first coolant passageway and the second coolant passageway do not mix within the electrical machine.

6. The method of claim 4, wherein the step of directing the liquid coolant along the first coolant passageway comprises directing the liquid coolant to both forward and aft end windings, wherein the liquid coolant is introduced to the outer electrical machine stator through one or both the forward and aft end windings or a cooling jacket.

7. The method of claim 4, wherein the step of directing the liquid coolant along the second coolant passageway comprises spraying the liquid coolant onto the rotor support that connects the inner electrical machine rotor to the rotary member.

8. The method of claim 4, wherein the step of directing the liquid coolant along the second coolant passageway comprises directing liquid coolant through the rotor support that connects the inner electrical machine rotor to the rotary member.

9. The method of claim 4 further comprising draining the liquid coolant from the rotor compartment.

10. The method of claim 2 further comprising directing cooling air at least partially around the outer casing thereby forming a cooling air buffer.

11. A gas turbine engine comprising:
a compressor section and a turbine section arranged in serial flow order, the compressor section and the turbine section together defining a core airflow path;
a rotary member rotatable with at least a portion of the compressor section and with at least a portion of the turbine section;
an electrical machine located at least partially inward of the core airflow path in a radial direction, the electrical machine comprising an outer electrical machine stator and an inner electrical machine rotor that is coupled to the rotary member; and
a cooling system comprising a coolant passageway that directs a liquid coolant past the outer electrical machine stator to the inner electrical machine rotor for removing heat from the inner electrical machine rotor, the coolant passageway further extending along a rotor support that connects the inner electrical machine rotor to the rotary member.

12. The gas turbine engine of claim 11 further comprising an outer casing that encloses the electrical machine, the outer casing comprising a stator compartment that houses the outer electrical machine stator and a rotor compartment that houses the inner electrical machine rotor, the stator compartment separated from the rotor compartment.

13. The gas turbine engine of claim 12, wherein a dividing wall separates the stator compartment and the rotor compartment.

14. The gas turbine engine of claim 12 comprising a nozzle located in the rotor compartment that is configured to spray the liquid coolant onto one or both of the inner electrical machine rotor, the coolant passageway delivering the liquid coolant to the nozzle.

15. The gas turbine engine of claim 14 further comprising a drain that drains the liquid coolant from the rotor compartment.

16. The gas turbine engine of claim 11 further comprising a thermal shield forming an enclosure at least partially around the electrical machine, the thermal shield at least partially defining a cooling airflow path at least partially around the electrical machine.

17. The gas turbine engine of claim 16 further comprising a turbine rear frame downstream of the turbine section and comprising a strut that includes an airflow passageway extending radially through the strut in fluid communication with the enclosure.

18. The gas turbine engine of claim 11, wherein the coolant passageway is a first coolant passageway, the cooling system comprising a second coolant passageway that directs the liquid coolant to the outer electrical machine stator, wherein the liquid coolant is introduced to the outer electrical machine stator through one or both the forward and aft end windings or a cooling jacket.

19. The gas turbine engine of claim 11, wherein the rotor support comprises a rim inwardly adjacent the inner electrical machine rotor, the rim having a channel that directs the liquid coolant through the rim.

20. The gas turbine engine of claim 11, wherein the coolant passageway extends through the rotor support.

* * * * *